United States Patent
Golitschek Edler Von Elbwart et al.

(10) Patent No.: US 7,046,975 B2
(45) Date of Patent: May 16, 2006

(54) METHOD AND SYSTEM FOR BLIND DETECTION OF MODULATION TYPE

(75) Inventors: Alexander Golitschek Edler Von Elbwart, Darmstadt (DE); Eiko Seidel, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 470 days.

(21) Appl. No.: 10/275,909

(22) PCT Filed: Mar. 13, 2001

(86) PCT No.: PCT/EP01/02813

§ 371 (c)(1),
(2), (4) Date: Apr. 8, 2003

(87) PCT Pub. No.: WO02/073916

PCT Pub. Date: Sep. 19, 2002

(65) Prior Publication Data

US 2003/0166395 A1    Sep. 4, 2003

(51) Int. Cl.
*H04B 1/16* (2006.01)
*H04B 14/04* (2006.01)

(52) U.S. Cl. ............ 455/205; 375/242; 375/243; 455/228

(58) Field of Classification Search .......... 455/228, 455/293, 295, 309, 337, 312, 205, 340; 375/243, 375/242, 254, 324, 340
See application file for complete search history.

(56) References Cited

U.S. PATENT DOCUMENTS 4,862,457 A * 8/1989 Morimoto .................. 714/775
5,809,083 A * 9/1998 Wright ...................... 375/285

(Continued)

FOREIGN PATENT DOCUMENTS

EP     0822714 A2    2/1998

(Continued)

OTHER PUBLICATIONS

Japanese Office Action dated Dec. 14, 2004 with English translation.

(Continued)

*Primary Examiner*—Duc Nguyen
*Assistant Examiner*—Andrew Wendell
(74) *Attorney, Agent, or Firm*—Stevens, Davis, Miller & Mosher, LLP

(57) ABSTRACT

The invention relates to a method and a receiver for demodulating a modulation symbol in a communication system without knowledge of the modulation constellation employed in a transmitter to modulate this symbol before transmission. According to the method, the invention comprises the steps of interpreting the modulation symbol as a symbol of one of a family of hierarchical modulation constellations, decoding the demodulated symbol using a forward error correction (FEC) technique and demodulating the symbol according to the assumed modulation constellation. Finally, the demodulated symbol is checked for correctness. The receiver comprises a corresponding interpretation unit, a demodulator and an FEC decoder as well as means for checking the correctness of the demodulated symbol.

15 Claims, 3 Drawing Sheets

U.S. PATENT DOCUMENTS

Figure 1:
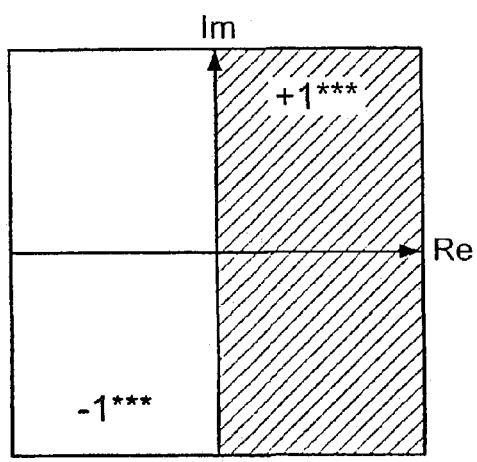

| | | | |
|---|---|---|---|
| 5,862,175 A * | 1/1999 | Sugiyama et al. | 375/219 |
| 6,069,899 A * | 5/2000 | Foley | 370/494 |
| 6,205,188 B1 * | 3/2001 | Stott et al. | 375/344 |
| 6,341,023 B1 * | 1/2002 | Puc | 398/79 |
| 6,400,928 B1 * | 6/2002 | Khullar et al. | 455/67.11 |
| 6,463,107 B1 * | 10/2002 | Lindoff et al. | 375/343 |
| 6,611,795 B1 * | 8/2003 | Cooper | 702/191 |
| 6,940,827 B1 * | 9/2005 | Li et al. | 370/278 |
| 2002/0013135 A1 * | 1/2002 | Proctor, Jr. | 455/228 |
| 2002/0120902 A1 * | 8/2002 | Brown | 714/776 |

FOREIGN PATENT DOCUMENTS

| | | | |
|---|---|---|---|
| EP | 0822714 A2 * | 6/1998 | |
| EP | 0848515 A2 | 6/1998 | |
| EP | 0944200 A2 | 9/1999 | |
| EP | 1011245 A1 | 6/2000 | |
| EP | 0984595 * | 10/2000 | |
| JP | 5218914 | 8/1993 | |
| JP | 10117328 | 5/1998 | |
| JP | 11239192 | 8/1999 | |

OTHER PUBLICATIONS

M. Uesugi, et al.: "A Layered Demodulation Scheme for Adaptive Modulation Systems Without Modulation Information Transmission", Wireless Solution Laboratories, Matsushita Communication Industrial Co., Ltd.; pp. 1-7.

* cited by examiner

METHOD AND SYSTEM FOR BLIND DETECTION OF MODULATION TYPE

The present invention relates to a method of demodulating a modulation symbol in a receiver of a communication system without knowledge of the modulation scheme employed in a transmitter to modulate the symbol before transmission. Further, the invention relates to a receiver in a communication system to carry out such demodulation method.

In communication systems, high modulation transmission of information is necessary to achieve high data transmission rates. However, the higher the order of the modulation, the more likely it is that a certain number of bits cannot be decoded correctly after demodulation. Therefore, sometimes it is desirable to adapt the modulation order according to the quality of the channel. This is particularly important for radio communication systems, where reasons for the adaptation can be either one of channel conditions, noise/interference limitations, scheduling requirements or radio resource availability It is clear to those skilled in the art that the given criteria are non-exhaustive. Usually, adaptive modulation involves a multitude of possible modulation orders that allow to transmit more data at the expense of error-robustness of the transmission.

The receiver in a communication system has to be able to demodulate the received signal. A method known in the art to cope with adaptive modulation transmission is so-called "blind modulation". Here, the modulation scheme used by the transmitter is not known to the receiver. Therefore, the receiver has to demodulate the received signal according to different modulation constellations. In order to decide which modulation scheme was used, some sort of error detection scheme is needed, and if for a given assumed modulation order the error detection scheme yields no errors, this modulation order is selected for demodulation.

However, in particular in radio communication systems, which frequently experience interference and varying channel conditions, it is difficult to distinguish between errors which result from bad channel quality and those which result from the fact that the modulation order assumed at the receiver does not correspond with the modulation scheme used by the transmitter. Hence, the "blind modulation" only works under the condition that the transmission of data is very robust against errors.

An example for a "blind modulation" scheme is disclosed in "A Layered Demodulation Scheme for Adaptive Modulation Systems Without Modulation Information Transmission" presented at the Third International Symposium on Wireless Personal Multimedia Communications (WPMC) on Nov. 12–15, 2000, Bangkok, Thailand.

Other known adaptive modulation methods require knowledge of the employed modulation scheme or constellation. Hence, it is known in the art to transmit, in addition to the modulated symbols, information which tells the receiver which modulation scheme was employed in the transmitter to modulate the symbol prior to transmission. With this knowledge, the receiver can apply the correct demodulation. Another approach known in the art is to let the receiver decide which modulation scheme should be used by the transmitter for future symbols. According to some algorithm (e.g. depending on the channel condition), the receiver makes a decision and delivers information on the desired modulation scheme to the transmitter through a feedback channel.

The drawback of both above described approaches is that they require additional signalling, i.e. they occupy part of the communication resource to indicate the modulation of choice or some other kind of overhead to facilitate demodulation. This means that less communication resource is available for a user to transmit the desired information. Finally, the prior art modulation methods add hardware complexity to the receiver.

The object underlying the present invention is to provide a demodulation method and a receiver in a communication system being able to demodulate correctly the symbols modulated with an unknown modulation scheme without sending overhead signaling for the modulation operation and without adding complexity to the receiver.

This object is solved according to a demodulation method defined by the method steps of claim 1 and respectively by a receiver comprising the features of claim 9.

According to the method and receiver underlying the present invention, a modulation symbol is interpreted as a symbol of one of a family of hierarchical modulation constellations and demodulated according to the assumed constellation. Subsequently, the demodulated symbol is decoded using an FEC technique and then checked for correctness.

Consequently, the transmitter does not need to send overhead signalling for the demodulation operation and the receiver demodulates the symbol according to a "trial and error" principle under inclusion of the FEC technique to ensure that transmission errors in the decoding operation are corrected in order to compensate for bad channel conditions. Although it might take several trials until the correct modulation constellation is found, such demodulation approach is extremely simple and can be implemented fairly easily in a signal processing circuit. Hence, the structure of the corresponding demodulation receiver underlying the invention is also significantly simplified.

Moreover, the present invention takes advantage of the fact that in most communication systems, in particular, in radio communication systems, a check for correctness of the demodulated symbols is already carried out as a standard procedure for assessing other criteria, such as, for example, the quality of the communication link.

According to a further embodiment of the method, the FEC technique is used to determine whether the decoding result, i.e. the modulated symbol is correct. According to this embodiment, the method becomes further simplified, as it obviates the need for a separate verification of the correctness of the demodulated symbol.

According to a variant of the method, the step of checking the demodulated symbol for correctness is performed by a separate cyclic redundancy check (CRC) error detection unit which verifies the demodulated symbols in a fast and reliable manner.

According to a further preferred embodiment of the method, a modulation symbol is constituted by a structure of an M-tuple of bits. The modulation constellation is therefore formed by a plurality of $2^M$ modulation symbols. The defined structure of the modulation symbol is useful for mapping the symbol bits into a signal constellation diagram containing a plurality of regions defined by decision boundaries for each bit.

According to a further preferred embodiment of the method, the steps of interpreting and demodulating are successively repeated, wherein in each iteration the modulation symbol is interpreted as a symbol of a different one of the plurality of possible modulation constellations. Hence, the method repeats the steps of interpreting and demodulating until the correct demodulated symbol is obtained. The corresponding embodiment of the receiver underlying the invention contains a feedback loop for notifying the interpretation unit on the result of the check for correctness.

According to a variant of the method underlying the invention, the steps of interpreting and demodulating are carried out simultaneously for a plurality of different possible modulation constellations. Further, the demodulated symbols are selected depending on the result of the check for correctness. In the corresponding preferred embodiment of the receiver, the means for interpreting and demodulating are arranged in parallel branches in order to allow the simultaneous processing. According to this embodiment, although hardware complexity is increased, the advantage lies in the fact that correct demodulated symbols are obtained very quickly.

According to a further advantageous embodiment of the method, the modulation constellations are of different order and the repetition of the interpretation and demodulation steps are performed in a descending modulation order. Alternatively, the repetition can be based on the preceding successful modulation constellation which provided correct demodulated symbols.

In the following, preferred embodiments of the present invention are described in further detail in order to facilitate the understanding of the invention with reference to the accompanying drawings.

Figure 3:
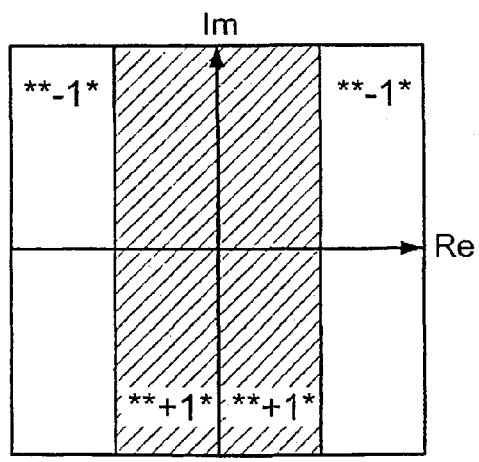
Figure 4:
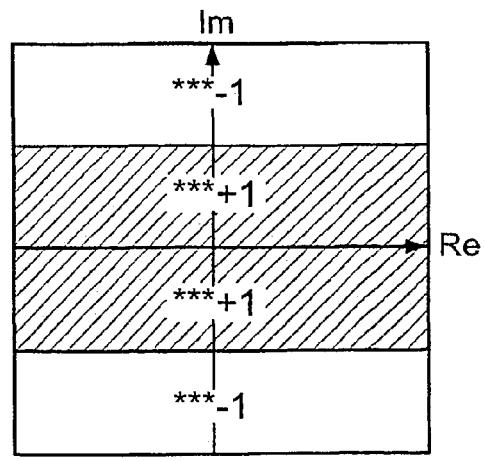
Figure 5:
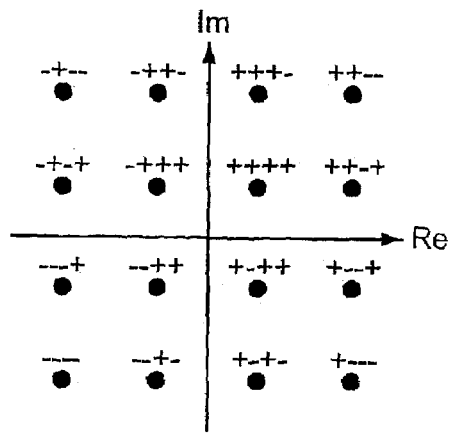
Figure 6:
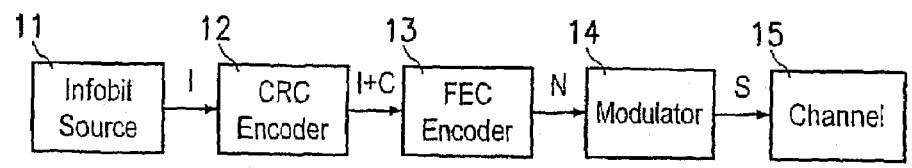
Figure 7:
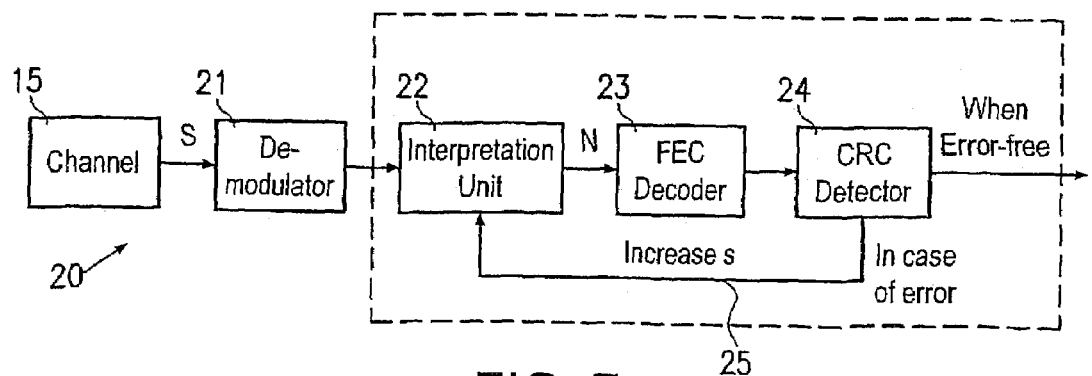
Figure 8:
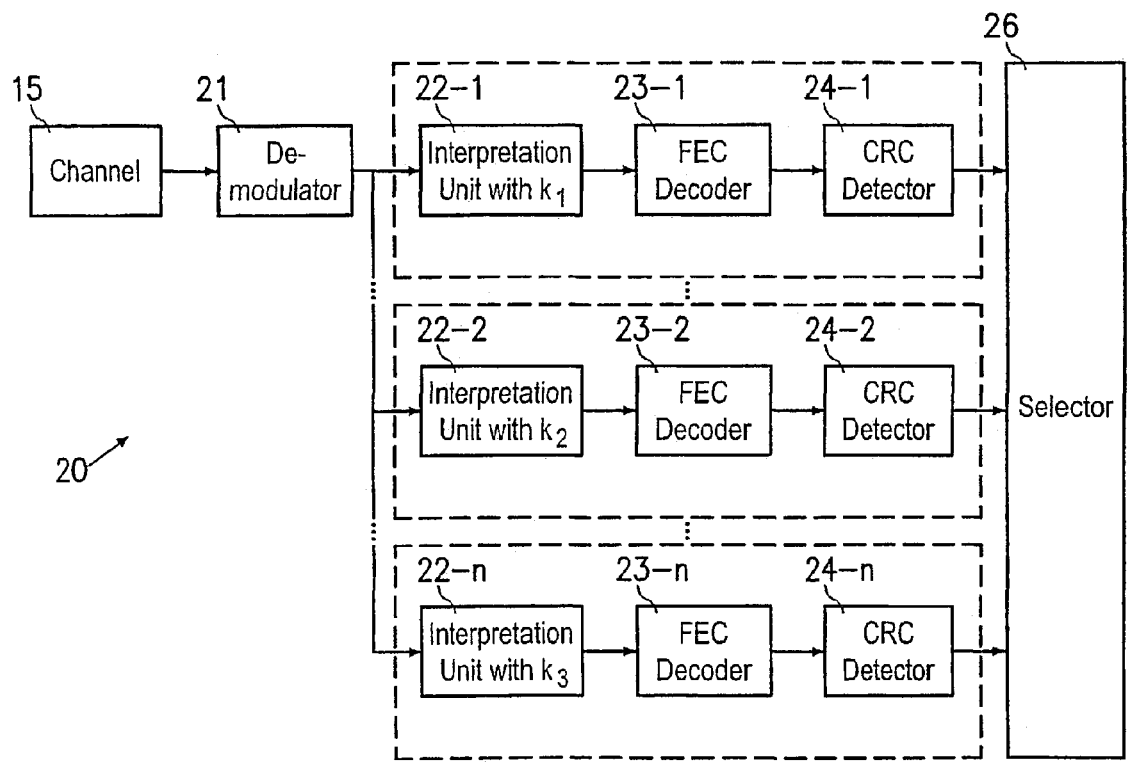

FIGS. 1–4 shows examples of QAM signal constellation diagrams in the complex signal plane, FIG. 5 illustrates an example of a 16-QAM signal constellation diagram in the complex signal plane, FIG. 6 shows a transmitter of a communication system to which the method underlying the invention is applied, FIG. 7 shows a first embodiment of a receiver underlying the invention, and FIG. 8 shows a second embodiment of a receiver underlying the invention.

In connection with FIGS. 1–4, the concept of a family of hierarchical modulation constellations will be explained. In each figure, a bit value $S_x$ is mapped into a region of the complex signal plane. Generally, a symbol S is constituted by a structure $S_0 \ldots S_{M-1}$ of an M-tuple of code bits. Hence, there are $2^M$ modulation symbols possible, which in its entirety form a modulation constellation or symbol alphabet. In a communication system, several modulation constellations are generally possible, which are distinguished by the number of bits used to define the modulation order.

Figure 2:
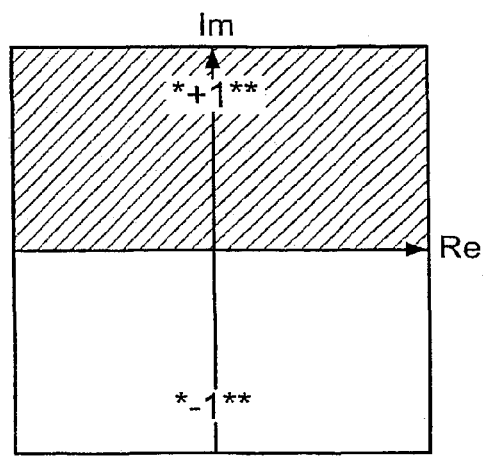

The regions in the signal constellations diagrams depend on the position of the bit within a symbol S as well as on its bit value $S_x$ which can be either "+1" or "−1". A "*" signifies bit values that do not influence the region for the bit A constellation like that of FIG. 1 shows that the bit $S_0$ is mapped to two different regions, i.e. to the left side having a bit value of "−1" or to the shaded right side having a bit value of "+1". Similar constellations for the bit at the second, third and fourth positions are shown in FIGS. 2–4 respectively. Hence, these figures show the regions for a total of four bits which form a 16-QAM symbol that is depicted in FIG. 5. For simplicity, in FIG. 5 each bit is only represented by its sign, either "+" or "−". If the modulation order is increased, this process continues in theory infinitely.

If the M regions corresponding to the respective bit $S_x$ (x=0 ... M−1) are overlaid, the regions where a demodulator would normally define the decision boundaries for the symbol $S=(S_0 \ldots S_{M-1})$ are obtained, where $S_0$ is designated as the "top bit" while $S_{M-1}$ is the "bottom bit". The specific symbol which is transmitted in the communication system is usually located in the center of such a decision region.

For a further discussion of digital demodulation in signal constellation diagrams, see e.g. PROAKIS "Digital Communications, $3^{rd}$ Edition" 1995 McGraw-Hill, ISBN 0-07-051726-6, pages 173 ff.

FIG. 6 shows a typical transmitter 10 to which the method underlying the invention is applied. From an infobit source 11, a sequence of infobits having a length l and constituting an infoword are input to a CRC encoder 12. In the encoder, the infoword is appended with an error detection check sum (e.g. CRC) of length C. The resulting sequence of length l+C is then processed through an FEC encoder 13, which adds redundancy used to correct errors at the receiver. The output of the FEC encoder is a sequence of codebits constituting a codeword of length N which is input to a modulator 14 where a symbol S is constructed from the code word. As mentioned above, the symbol S generally has the structure of an M-tuple of bits $S_0 \ldots S_{M-1}$. Finally, the symbol is mapped onto the physical communication channel 15 of the communication system and transmitted by means of known transmission methods, e.g. TDMA, CDMA, or FDMA multiplex schemes suited for radio communication systems. It is clear to those skilled in the art that other modulation schemes can equally be applied depending on the specific requirements for the communication channel.

FIG. 7 shows a first embodiment of the receiver 20 according to the invention. Upon receiving a symbol S through the communication channel 15, a demodulator 21 starts to demodulate the symbol assuming the highest modulation order which occurs at the transmission system. Hence, the M-tuple of bit values constituting a symbol of the highest occurring modulation order are buffered in an interpretation unit 22.

The interpretation unit 22 utilizes only part of the demodulated information received from the demodulator 21 and treats the modulator symbol as if it originates from another modulation constellation with fewer constellation points, i.e. having a lower modulation order. For example, if the demodulator is adapted for 16-QAM, the interpretation unit 22 interprets its input by forwarding only the two most significant bits to its output. The joined function of the demodulator 21 and the interpretation unit 22 is thus identical to the function of a demodulator for QPSK. This effect however requires that the structure of the modulation constellation employed is hierarchical as described above with regard to FIGS. 1–4.

Subsequently, the interpretation unit buffer provides the number of infobits to an FEC decoder 23 in order to correct errors in the received symbol. After decoding, a CRC detector 24 performs an error detection check over the decoded infobits to determine whether the codeword has been decoded correctly.

A more detailed discussion of FEC and CRC coding techniques is available from Sampei, Seiichi "Applications of Digital Wireless Technologies to Global Wireless Communications," Prentice Hall 1997, ISBN 0-13-214272-4, Chapter 6.

If the result is free of errors, the codeword is output, as sequence of infobits. If the error detection finds the demodulated symbol to be incorrect, a feedback loop 25 provides an instruction command to the interpretation unit 22 to repeat the interpretation and demodulation operation.

In the second iteration, it is assumed that the preceding modulation constellation is incorrect and hence, a different modulation constellation is tried. For example, a modulation constellation of the lower order is assumed to be correct and the corresponding number of bits for this modulation constellation is input to the buffer of the interpretation unit 22.

After decoding and error detection, it is again determined whether the result is free of errors.

This process continues until either the number of possible modulation orders is reached or the error detection indicates correct reception. The effects for the described approach for hierarchical modulation is that after the interpretation unit, the values at the input to the FEC decoder are exactly the same as if the demodulator was working for lower order modulation.

In the following, an example for possible modulation orders are described:
64-QAM: 1 symbol=6 bits, $M_1=6$,
16-QAM: 1 symbol=4 bits, $M_2=4$,
QPSK: 1 symbol=2 bits, $M_3=2$.

Generally, with each iteration s, the top $M_{max}-K_s$ bit values of each symbol which are applied from the interpretation unit buffer to the FEC decoder starting with $k_1=0$. The bottom $k_s=M_{max}-M_s$ values of each symbol S are not forwarded to the FEC decoder. Under the assumption that each modulation constellation consists of $2^M$ constellation points and $M_s>M_1$ for all iterations s, then $k_s=M_1-M_s$ ($M_1$ is then equivalent to $M_{max}$).

In the present example, the number of possible modulation orders and hence, the number of iterations is 3. In the successive iterations, the top $M_{max}-k_s$ bit values of each symbol are input to the interpretation unit buffer 22. In the first iteration, all six values are forwarded to the decoder. Hence, $k_1=0$. In case of errors output from the CRC decoder 24, the demodulation and decoding operation is repeated. In the second iteration $k_2=2$ and only the top four values of each symbol are forwarded to the decoder. This is equivalent to demodulating the received signal according to the 16-QAM modulation scheme. Finally, in the third and last iteration, $k_3=4$ and only the top two values are forwarded to the decoder which is equivalent to a QPSK modulation. As a result, although there is only one demodulator required in the receiver, the output is interpreted as if several demodulators were present.

In the above-described embodiment, the value $k_s$ has been incremented. The increment value depends on the type of modulation constellations that are employed. An increment value of 2 can be applicable for QAM signal constellations, since this generates a cascade of interpreting the received symbols as 64-QAM→16-QAM→QPSK symbol if we assume 64-QAM to be the modulation constellation with the highest available order. However, the increment value does not have to be constant and depending on the modulation constellations employed in the system, it can vary, for example, 16-PSK→8-PSK→2-PSK which results in values of $k_1=0$, $k_2=1$, $k_3=3$.

Although it has been described above that the demodulation should be attempted first for the highest order modulation constellation, it is clear to the skilled person that the attempt can be also ordered in descending order. Further, it is possible that the last correctly detected modulation constellation is tried first based on the reasoning that the most probable modulation constellation is the one that was used in the previous demodulation event.

If no correct decoding is possible, any of the (wrongly) decoded infowords can be chosen as output, since there is no way of telling which of the decoding loops resulted in the least number of bit errors. Therefore, any of the outputs could be used as the final decision. Again, depending on the system, it can be useful to choose that modulation output that was successful in the previous demodulation instant.

With reference to FIG. 8, a further embodiment of the receiver 20 according to the invention is described. This embodiment differs from that of FIG. 7 by the replacement of the feedback loop 25 by a plurality of parallel branches, each containing an interpretation unit 22-1, 22-2, . . . 22-n, an FEC decoder 23-1, 23-2, . . . 23-n and a CRC detector 24-1, 24-2, . . . 24-n. The elements of each branch corresponds essentially to those enclosed by a dashed line in the embodiment of FIG. 7. In each branch, the interpretation unit uses a distinct k value for simultaneously demodulating the received symbol from the demodulator 21 for all possible k values. Hence, the symbols are demodulated for all possible demodulation constellations simultaneously. Thereafter, a selector 26 chooses from all branches the one which indicates that demodulation has resulted in no errors which will then be chosen as the active branch for the final decision.

As a further variant of the embodiments of FIGS. 7 and 8, it is possible to substitute the CRC detector by an FEC decoder which is able to determine whether the FEC decoding operation is correct. Other forms of checking the output of the FEC decoder for correctness are also suitable for substituting the error detector 24.

The invention claimed is:

1. A method of demodulating a symbol in a receiver of a communication system without knowledge of the modulation constellation employed in a transmitter to modulate the symbol before transmission, the method comprising:
   (a) demodulating the symbol according to an assumed modulation constellation;
   (b) interpreting the modulation symbol as a symbol of one of a family of hierarchical modulation constellations;
   (c) decoding the demodulated symbol using a forward error correction (FEC) technique; and
   (d) checking the decoded symbol for correctness, wherein during the interpretation step Mmax−Ks of the symbol bits are applied to the FEC decoder where Mmax denotes the number of symbol bits of highest order modulation constellation, Ks is a value which varies for each assumed modulation constellation according to Ks=Mmax−Ms, where Ms is the number of symbol bits of the respective assumed modulation constellation.

2. The method of claim 1, wherein step (d) is performed using the FEC technique.

3. The method of claim 1, wherein step (d) is performed using a CRC detection unit.

4. The method of claim 1, wherein the modulation symbol is constituted by a structure $S_0 \ldots S_{M-1}$ of an M-tuple of symbol bits and the plurality of $2^M$ modulation symbols form the modulation constellation of a particular order.

5. The method of claim 1, wherein step (b) is successively repeated, wherein, in each iteration, the modulated symbol is interpreted as a symbol of a different one of the family of hierarchical modulation constellations.

6. The method of claim 5, wherein the repetitions of step (b) are at least one of (i) performed for modulation constellations of descending modulation order within the family of hierarchical modulation constellations and (ii) based on a previous successful modulation constellation which provided correct demodulated symbols.

7. The method of claim 1, wherein step (b) is performed simultaneously for a plurality of different possible modulation constellations and further comprises selecting the demodulated symbols depending upon the result of step (d).

8. The method of claim 1, wherein step (b) comprises storing Mmax−Ks symbol bits in a buffer before being applied to FEC decoding.

9. The method of claim 1, wherein step (a) comprises assuming the received symbol is of the highest order modulation constellation representing Mmax symbol bits.

10. A receiver in a communication system that demodulates a modulation symbol without knowledge of the modulation constellation employed in a transmitter to modulate the symbol prior to transmission, the receiver comprising:
   a demodulator that demodulates the symbol according to an assumed modulation constellation;
   an interpretation unit that interprets the modulation symbol as a symbol of one of a family of hierarchical modulation constellations;
   a forward error correction (FEC) decoder that decodes Mmax—Ks bits of the demodulated symbol, where Mmax denotes the number of symbol bits of highest order modulation constellation, Ks is a value which varies for each assumed modulation constellation according to Ks=Mmax−Ms, where Ms is the number of symbol bits of the respective assumed modulation constellation; and
   an error checker that checks the demodulated symbol for correctness.

11. The receiver of claim 10, wherein the FEC decoder is operable to check the decoded symbol for correctness.

12. The receiver of claim 10, wherein said checker comprises a CRC detection unit that checks the demodulated symbol for correctness.

13. The receiver of claim 10, further comprising a feedback loop for notifying the interpretation unit of the result of the check for correctness.

14. The receiver of claim 10, comprising a plurality of interpretation units, FEC decoders and error checkers, arranged in parallel branches to demodulate the symbols simultaneously for a plurality of different possible modulation constellations.

15. The receiver of claim 10, wherein the interpretation unit comprises a buffer that stores Mmax−Kx symbol bits.

* * * * *